United States Patent [19]
Umeki et al.

[11] Patent Number: 5,998,967
[45] Date of Patent: Dec. 7, 1999

[54] LITHIUM-ION BATTERY PACK

[75] Inventors: Nobuaki Umeki; Kouichi Inoue, both of Kyoto, Japan

[73] Assignee: Rohm Co., Ltd., Kyoto, Japan

[21] Appl. No.: 09/249,852

[22] Filed: Feb. 16, 1999

[30] Foreign Application Priority Data

Feb. 16, 1998 [JP] Japan .................................. 10-032887

[51] Int. Cl.$^6$ .............................................. H01M 10/46
[52] U.S. Cl. ...................................................... 320/122
[58] Field of Search ................................. 320/116, 118, 320/120, 122, FOR 114, FOR 117

[56] References Cited

U.S. PATENT DOCUMENTS

| | | | |
|---|---|---|---|
| 3,328,663 | 6/1967 | Kagan | 320/122 |
| 4,061,955 | 12/1977 | Thomas et al. | 320/122 |
| 5,675,233 | 10/1997 | Kaneko et al. | 320/122 |
| 5,850,136 | 12/1998 | Kaneko | 320/122 X |

FOREIGN PATENT DOCUMENTS

| | | |
|---|---|---|
| 8-19188 | 1/1996 | Japan . |
| 9-28042 | 1/1997 | Japan . |

*Primary Examiner*—Edward H. Tso
*Attorney, Agent, or Firm*—Nikaido, Marmelstein, Murray & Oram LLP

[57] ABSTRACT

A lithium-ion battery pack, despite having a simple circuit configuration, allows the charge amount of the individual battery cells provided therein to be made uniform quickly. For each battery cell, a cell balance circuit is provided that includes a resistor, a transistor, and a control circuit. The resistor and the transistor are connected in series, with their end terminals connected to the two terminals of the battery cell. The control circuit controls the state of the transistor so that the two terminals of the battery cell are short-circuited through the resistor when necessary. The control circuit includes an oscillation circuit for producing a sawtooth wave voltage that oscillates within a predetermined voltage range and outputting it after adding it to the voltage at the negative terminal of the battery cell, and a comparator for comparing the voltage at the positive terminal of the battery cell with the voltage output from the oscillation circuit and outputting, when the former exceeds the latter, a control voltage that makes the transistor conduct. When the cell voltage is within the range of the voltage produced by the oscillation circuit, the transistor is driven with a pulse-width-modulated driving voltage.

7 Claims, 6 Drawing Sheets

LITHIUM-ION BATTERY PACK

BACKGROUND OF THE INVENTION

1. Field of the Invention

The present invention relates to a lithium-ion battery pack, and more particularly to a lithium-ion battery pack provided with a cell balance system for keeping uniform the amount of electric charge accumulated in individual battery cells connected in series.

2. Description of the Prior Art

A lithium-ion battery pack, which includes a plurality of lithium-ion battery cells connected in series, is rechargeable, meaning that a battery pack discharged by use can be recharged for further use. To achieve safe recharging, it is essential to prevent overcharging of the battery cells, and thus the charging of the battery cells is typically so controlled as to be stopped as soon as the voltage across any one of the battery cells reaches the maximum permissible voltage.

However, since the individual battery cells discharge different amounts of electric charge in actual use, they often come to have different voltages from one another. In such a case, recharging tends to bring into a fully charged state only the battery cell that has discharged the least during use, leaving the other battery cells in an incompletely charged state.

For this reason, a lithium-ion battery pack is usually provided with a cell balance system, which serves to prevent overcharging and simultaneously achieve uniform charging of all of its battery cells. FIG. 6 shows the circuit configuration of a conventional lithium-ion battery pack.

In this circuit configuration, for each of a number n of battery cells LC(k) (k=1, . . . , n), a cell balance circuit CLB(k) is provided that is composed of a resistor Rb(k), a transistor Tb(k) acting as a switching device, and a control circuit CLC(k). For each battery cell LC(k), the resistor Rb(k) and the transistor Tb(k) are connected in series between the two terminals of the battery cell LC(k). The control circuit CLC(k) monitors the voltage across the battery cell LC(k) to control the conduction state of the transistor Tb(k) in accordance with that voltage.

FIG. 7 shows the circuit configuration of the control circuit CLC(k). The control circuit CLC(k) is composed of a reference voltage generator VG(k), a comparator CMP(k), two input terminals Vp(k) and Vn(k) connected to the positive and negative terminals, respectively, of the battery cell LC(k), and an output terminal Vc(k) connected to the gate of the transistor Tb(k). The comparator CMP(k) has two input terminals of which one is connected to the input terminal Vp(k) and the other is connected through the reference voltage generator VG(k) to the input terminal Vn(k), and has an output terminal that is connected to the output terminal Vc(k).

The reference voltage generator VG(k) receives, via the input terminal Vn(k), the voltage at the negative terminal of the battery cell LC(k), and outputs a reference voltage that is equal to a predetermined level $V_{TH0}$ added to the received voltage. The comparator CMP(k) receives, via the input terminal Vp(k), the voltage at the positive terminal of the battery cell LC(k), and compares the received voltage with the voltage fed from the reference voltage generator VG(k). In accordance with which of these two voltages is higher, the comparator CMP(k) outputs a first or a second predetermined voltage in such a way as to make the transistor Tb(k) conduct when the voltage at the positive terminal of the battery cell LC(k) is higher than the reference voltage. When the transistor Tb(k) conducts, a bypass path is formed through the resistor Rb(k) in parallel with the battery cell LC(k).

FIG. 8 shows the relationship between the voltage of the battery cell LC(k) and the operation of the transistor Tb(k) during charging. In FIG. 8, the graph at (a) shows the voltage (cell voltage) $V_{cell}$ between the two terminals of the battery cell LC(k), and the graph at (b) shows whether the transistor Tb(k) is in a conducting (on) state or in a non-conducting (off) state. In both graphs, the lapse of time after the start of charging is taken along the horizontal axis.

As the result of the operation of the control circuit CLC(k) as described above, when the cell voltage $V_{cell}$ is lower than the predetermined level $V_{TH0}$, the transistor Tb(k) is kept in the non-conducting state, with the result that a current flows through the battery cell LC(k) so as to charge it. By contrast, when the cell voltage $V_{cell}$ is equal to or higher than the predetermined level $V_{TH0}$, the transistor Tb(k) is kept in the conducting state, with the result that the current flows mostly through the bypass path, greatly slowing down the progress of charging.

Consequently, the battery cells that have a cell voltage lower than the predetermined level $V_{TH0}$ are charged with priority. On the other hand, for the battery cells that have a cell voltage equal to or higher than the predetermined level $V_{TH0}$, the increasing rate of their cell voltage is kept so low that the maximum permissible voltage $V_{OCH}$ that is set to prevent overcharging is reached slowly. In this way, the amount of electric charge accumulated in the individual battery cells is made substantially uniform.

However, in this conventional cell balance system, the control circuit CLC(k) controls the operation of the transistor Tb(k) on the basis of only one predetermined level $V_{TH0}$. As a result, the adjustment of the charge amount needs to be started as late as immediately before the completion of charging, and thus an unduly long time is required to make the charge amount of all of the battery cells uniform. Moreover, for the battery cells whose cell voltage has already reached the predetermined level $V_{TH0}$, a current is kept flowing through the bypass path, and thus the resistor Rb(k) produces much heat. To prevent the resistor Rb(k) from being destroyed by heat, it is inevitable to give it a considerably high resistance to reduce the current that flows through the bypass path. This, however, makes even longer the time required to make the charge amount of the individual battery cells uniform.

Japanese Laid-Open Patent Application No. H8-19188 proposes a charging apparatus for charging a set battery having a plurality of battery cells connected in series. In this charging apparatus, for each of the battery cells, a bypass path is provided that is composed of a resistor and a transistor connected in series, and in addition a control circuit is provided that controls the conduction state of each bypass path individually. During charging, the control circuit monitors the cell voltage of each battery cell and calculates the voltage difference ΔVmin between the cell voltage of each battery cell and the minimum cell voltage; in accordance with this voltage difference ΔVmin, the control circuit controls the conduction state of the bypass path by one of the following two methods.

According to the first method, for the battery cells whose voltage difference ΔVmin is equal to or higher than a first predetermined level, the bypass path is made to conduct so that the difference in the charge amount among the battery cells will be reduced. Moreover, when the voltage difference ΔVmin of the battery cells for which the bypass path has been kept conducting to keep the charging rate low becomes equal to a second predetermined level that is lower than the first predetermined level, the bypass path for those battery cells is cut off so that charging will be continued while maintaining the reduced difference in the charge amount.

According to the second method, the current that flows through the bypass path is adjusted in accordance with the voltage difference ΔVmin. Specifically, for each battery cell, the transistor is so controlled as to operate with a duty factor that varies in proportion to the voltage difference ΔVmin. The higher the duty factor with which the transistor of a bypass circuit operates, the higher the current that flows through the bypass circuit. Thus, the larger the amount of electric charge accumulated in a battery cell, the lower the charging rate at which the battery cell is charged. In this way, the difference in the charge amount among the battery cells is gradually reduced.

On the other hand, Japanese Laid-Open Patent Application H9-28042 proposes a charge control apparatus for charging a set battery. In this charge control apparatus, too, for each of the battery cells, a bypass path is provided that is composed of a resistor and a transistor connected in series, and in addition a control circuit is provided that controls the conduction state of each bypass path individually. Before starting charging, the control circuit monitors the cell voltage of each battery cell and calculates the voltage difference ΔVmax between the cell voltage of each battery cell and the maximum cell voltage; in accordance with this voltage difference ΔVmax, the control circuit controls the conduction state of the bypass path by one of the following three methods.

According to the first method, for the battery cells whose cell voltage has reached a predetermined level, the bypass path is made to conduct; in addition, the current that is allowed to flow through each bypass path is determined in accordance with the voltage difference ΔVmax so that the cell voltage of all of the battery cells will reach, substantially at the same time, the maximum permissible voltage that is set to prevent overcharging. According to the second method, for each battery cell, the level of the cell voltage that activates the transistor of the bypass path is determined in accordance with the voltage difference ΔVmax so that the cell voltage of all of the battery cells will reach, substantially at the same time, the maximum permissible voltage that is set to prevent overcharging. According to the third method, the variation of the cell voltage among all of the battery cells is calculated from the voltage difference ΔVmax of each battery cell so that the bypass path will be allowed to conduct only when the variation exceeds a predetermined range.

The charging apparatus and the charge control apparatus described above are both capable of adjusting the current that flows through the bypass path, and are therefore capable of making the charge amount of all of the battery cells uniform with ease. It is possible even to apply the control methods used in those apparatuses to a cell balance system for a lithium-ion battery pack.

However, in both of the apparatuses described above, the bypass path is controlled on the basis of the voltage difference ΔVmin between the cell voltage of each battery cell and the minimum cell voltage, or the voltage difference ΔVmax between the cell voltage of each battery cell and the maximum cell voltage. This requires, in addition to circuits for monitoring the cell voltage of the individual battery cells, circuits for performing comparison to find the minimum or maximum cell voltage, and also circuits, or a computing device such as a microcomputer, for calculating voltage differences. Thus, it is inevitable to use complicated and large-scale control circuits, in particular in a control module that is composed solely of analog circuits without using any logic circuit such as a microcomputer. Using such control circuits in a cell balance system for use in a battery pack ends in making the entire battery pack unduly large.

A wide variety of lithium-ion battery packs are commercially available, ranging from small-scale ones that include as few as two battery cells to large-scale ones that include a hundred or more battery cells. The smaller the scale of a lithium-ion battery pack, the more seriously the compactness of the battery pack is spoilt by the introduction of a large-scale cell balance system. Since small-scale battery packs are used mainly in portable electronic appliances such as portable telephones, they are required to be as small and light as possible, and accordingly a cell balance system for use in such appliances is required to have as simple a circuit configuration as possible. For this reason, it is not necessarily advisable to apply the control methods used in the two apparatuses described above to a cell balance system for use in a lithium-ion battery pack.

SUMMARY OF THE INVENTION

An object of the present invention is to provide a lithium-ion battery pack that allows the charge amount of the individual battery cells provided therein to be made uniform quickly under the control achieved by a simple circuit configuration.

To achieve the above object, according to the present invention, a lithium-ion battery pack is provided with: a series of battery cells composed of a plurality of battery cells connected in series; a set of a resistor and a switching device connected in series and provided one set for each of the battery cells, the set of the resistor and the switching device having one end connected to the positive terminal of the battery cell and having the other end connected to the negative terminal of the battery cell so that, every time the switching device conducts, the positive and negative terminals of the battery cell are short-circuited with each other through the resistor; and a control circuit provided one for each of the battery cells. In this lithium-ion battery pack, while the series of battery cells is being charged, with a voltage applied between the two end terminals thereof, the control circuit monitors the voltage between the positive and negative terminals of the battery cell to control the switching device in such a way that, when the monitored voltage is lower than a first predetermined level that is fixed relative to a maximum permissible voltage for the battery cell, the switching device is continuously kept in a non-conducting state, that, when the monitored voltage is equal to or higher than the first predetermined level and lower than a second predetermined level that is fixed relative to the maximum permissible voltage for the battery cell, the switching device is intermittently brought into a conducting state, and that, when the monitored voltage is equal to or higher than the second predetermined level, the switching device is kept continuously in the conducting state.

Thus, for each of the battery cells constituting the series of battery cells, a cell balance circuit is provided that is composed of a resistor, a switching device, and a control circuit. The cell balance circuit allows the charging rate to be adjusted for each battery cell. Here, in accordance with the cell voltage, the switching device is brought into one of the following three states: a continuous non-conducting state, an intermittent conducting state, and a continuous conducting state. The charging of the battery cell progresses at a high rate when the switching device is in the continuous non-conducting state, at a medium rate when the switching device is in the intermittent conducting state, and at a low rate when the switching device is in the continuous conducting state.

As the charging progresses, when the cell voltage of a battery cell reaches the first predetermined level, the battery cell will thereafter be charged at a medium rate. As the charging further progresses, when the cell voltage of the battery cell reaches the second predetermined level, the battery cell will thereafter be charged at a low rate. Thus, even if the individual battery cells have discharged different amounts of electric charge during use, whereas the battery cells that are already in the late stages of charging are charged at a medium rate, the battery cells that are still in the early stages of charging are charged at a high rate, and accordingly the difference in the charge amount diminishes quickly. As a result, when the cell voltage of one battery cell reaches the second predetermined level, the difference in the charge amount among the battery cells is already slight, and therefore it is possible to make the charge amount of all of the battery cells uniform quickly. In addition, the switching device is brought into a conducting state only intermittently, and therefore the resistor produces less heat. This makes it possible to increase the current that flows through the resistor, and thereby make the charge amount of the individual battery cells uniform more quickly.

Each control circuit controls the charging of the corresponding battery cell in accordance with the cell voltage of that battery cell alone, and therefore the charging of one battery cell is not affected by the cell voltage of the other battery cells. Accordingly, there is no need to provide a means to calculate the minimum or maximum cell voltage and to calculate the difference between the cell voltage of the individual battery cells and the minimum or maximum cell voltage. Moreover, the first and second predetermined levels are kept constant relative to the maximum permissible voltage, and therefore there is no need to provide a means to vary the first and second predetermined levels. Thus, charging can be controlled with a simple circuit configuration.

The control circuit may be so configured that, when the cell voltage is equal to or higher than the first predetermined level and lower than the second predetermined level, the length of the period in which the switching device is held in the conducting state is varied in accordance with the difference between the cell voltage and the first predetermined level. This makes it possible, with the battery cells whose cell voltage has reached the first predetermined level, to adjust the charging rate in accordance with the already accumulated charge amount, and thereby make the charge amount of the individual battery cells uniform more quickly.

Specifically, for example, the length of the period in which the switching device is held in the conducting state is varied substantially in proportion to the difference between the cell voltage and the first predetermined level. This makes it possible to gradually reduce the charging rate for the battery cells whose cell voltage has reached the first predetermined level, and thereby minimize the variation in the charge amount among all of the battery cells on completion of the charging.

When the cell voltage is equal to or higher than the first predetermined level and lower than the second predetermined level, the length of the period in which the switching device is held in the conducting state can be varied substantially in proportion to the difference between the cell voltage and the first predetermined level by bringing the switching device into the conducting state at regular intervals while keeping constant the sum of the length of the period in which the switching device is held in the conducting state and the length of the period in which the switching device is held in the non-conducting state.

Specifically, for example, the control circuit is composed of an oscillation circuit for producing a sawtooth wave voltage that oscillates between the first predetermined level and the second predetermined level at regular intervals and outputting it after adding it to the voltage at the negative terminal of the battery cell, and a comparator for comparing the voltage at the positive terminal of the battery cell with the voltage output from the oscillation circuit and outputting, when the voltage at the positive terminal of the battery cell is equal to or higher than the voltage output from the oscillation circuit, a first control voltage that causes the switching device to be brought into the conducting state and, when the voltage at the positive terminal of the battery cell is lower than the voltage output from the oscillation circuit, a second control voltage that causes the switching device to be brought into the non-conducting state.

It is preferable that all of the control circuits provided one for each of the battery cells be formed within a single semiconductor chip, and that all of the sets of the resistor and the switching device provided one set for each of the battery cells be formed separately from that semiconductor chip. This makes it possible to separate the control circuit from the resistor and the switching device, through which a relatively high current flows, and thereby stabilize the operation of the control circuit with ease. Moreover, forming a number of control circuits on a single semiconductor chip makes it possible to use semiconductor chips of an identical design in various types of battery packs that include as many or fewer battery cells, and thus helps enhance manufacturing efficiency.

It is also possible to additionally provide a first electrode terminal connected through a protection switching device to one of the two end terminals of the series of battery cells, a second electrode terminal connected to the other of the two end terminals of the series of battery cells, and a protection control circuit for monitoring the voltage between the positive and negative terminals of each of the battery cells so that, when at least one of the monitored voltages is out of a predetermined range, the protection switching device is brought into a cut-off state to inhibit the charging or discharging of the series of battery cells. In this case, it is preferable that the protection control circuit be formed within the semiconductor chip. This makes it possible to prevent overcharging and overdischarging of the battery cells. In addition, forming all the circuits related to the control of the charge amount of the battery cells within a single chip helps minimize the size of the battery pack.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
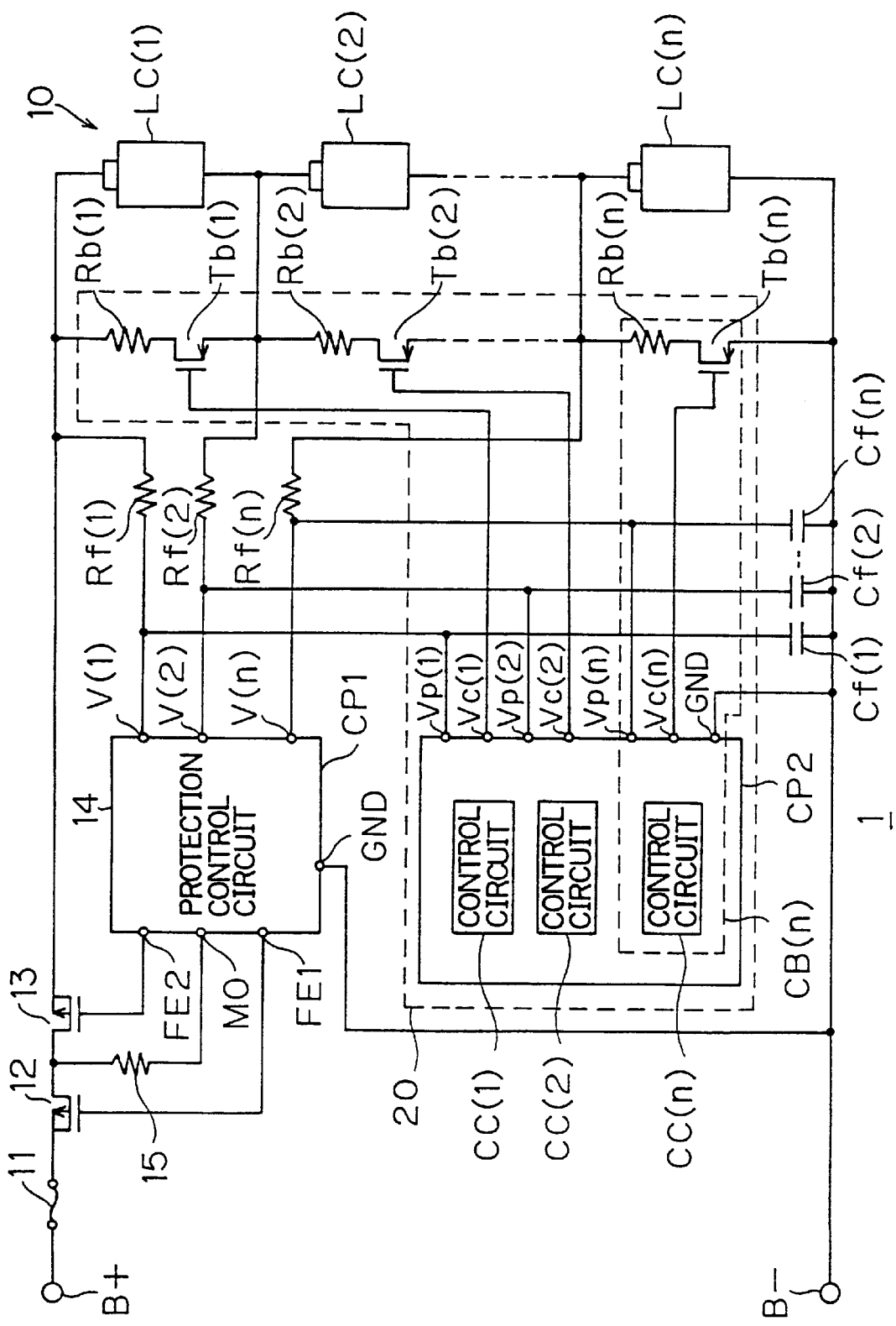
FIG. 1 is a diagram showing the circuit configuration of the lithium-ion battery pack of a first embodiment of the invention.

Hereinafter, lithium-ion battery packs embodying the present invention will be described with reference to the accompanying drawings. FIG. 1 shows the circuit configuration of the lithium-ion battery pack 1 of a first embodiment of the invention. The lithium-ion battery pack 1 includes a number n of lithium-ion battery cells LC(1), ..., LC(n) of an identical capacity connected in series. These battery cells LC(1), ..., LC(n) constitute a series 10 of battery cells.

In the following descriptions, for simplicity's sake, the battery cells LC(1), ..., LC(n) will be referred to as the battery cell LC(k) (k=1, ..., n). Moreover, as will be described in detail later, the lithium-ion battery pack 1 also includes the same number n of each of a few kinds of circuit element as the number n of the battery cells LC(k). Those circuit elements will be identified similarly with symbols followed by the subscript k in parentheses.

The lithium-ion battery pack 1 further includes a positive terminal B+ and a negative terminal B−. The positive terminal B+ is connected, through a protection fuse 11 and two transistors 12 and 13, to one end terminal (the positive end terminal) of the series 10 of battery cells (i.e. the positive terminal of the first battery cell LC(1)). The negative terminal B− is connected directly to the other end terminal (the negative end terminal) of the series 10 of battery cells (i.e. the negative terminal of the nth battery cell LC(n)). The transistors 12 and 13 operate under the control of a protection control circuit 14.

The protection control circuit 14 is formed on a single semiconductor chip CP1 having output terminals FE1 and FE2, an input terminal MO, and a terminal GND. The output terminals FE1 and FE2 are connected to the gate of the transistors 12 and 13, respectively. The input terminal MO is connected through a resistor 15 to the junction between the transistors 12 and 13. The terminal GND is connected to the negative end terminal of the series 10 of battery cells.

The protection control circuit 14 further has a number n of input terminals V(k). Each of the input terminals V(k) is connected through a resistor Rf(k) to the positive terminal of the corresponding battery cell LC(k), and is also connected through a capacitor Cf(k) to the negative end terminal of the series 10 of battery cells. Each pair of the resistor Rf(k) and the capacitor Cf(k) forms a low-pass filter.

The transistor 12 serves to prevent overcharging of the battery cell LC(k), and is controlled by a control voltage that is fed from the protection control circuit 14 via the output terminal FE1. Normally, the protection control circuit 14 keeps the transistor 12 in a conducting state; during charging, when the cell voltage $V_{cell}$ of any of the battery cells LC(k) reaches the maximum permissible voltage $V_{OCH}$, the protection control circuit 14 brings the transistor 12 into a cut-off state. The cell voltage $V_{cell}$ of the individual battery cells LC(k) is detected as the difference between appropriate ones among the voltages appearing at the input terminals V(k) and the voltage appearing at the terminal GND.

The transistor 13 serves to prevent overdischarging of the battery cell LC(k) during discharging, i.e. during use, and also serves, when an unduly high current flows through the battery pack, to shut off the current temporarily. The transistor 13 is controlled by a control voltage that is fed from the protection control circuit 14 via the output terminal FE2. Normally, the protection control circuit 14 keeps the transistor 13 in a conducting state; during discharging, when the cell voltage $V_{cell}$ of any of the battery cells LC(k) drops below the minimum permissible voltage $V_{MIN}$, the protection control circuit 14 brings the transistor 13 into a cut-off state. In addition, the protection control circuit 14 detects, by way of the resistor 15, the current that flows through the transistor 13 so as to bring the transistor 13 into a cut-off state also when the detected current exceeds a predetermined level.

Thus, the transistors 12 and 13 and the protection control circuit 14 protect the battery cells LC(k) by keeping the cell voltage $V_{cell}$ of all of the battery cells LC(k) equal to or higher than the minimum permissible voltage $V_{MIN}$ and lower than the maximum permissible voltage $V_{OCH}$; in addition, when an unduly high current is likely to flow through the battery pack as a result of, for example, a short circuit between the positive and negative terminals B+ and B−, they prevent a hazard by shutting off the current.

For each of the battery cells LC(k), a cell balance circuit CB(k) is provided that is composed of a resistor Rb(k), a transistor Tb(k) acting as a switching device, and a control circuit CC(k) for controlling the operation of the transistor Tb(k). These cell balance circuits CB(k) together constitute a cell balance system 20 that prevents overcharging and simultaneously makes uniform charging of all of the battery cells possible. The resistor Rb(k) and the transistor Tb(k) are connected in series with each other, and are together connected in parallel with the battery cell LC(k), with their end terminals connected to the positive and negative terminals of the battery cell LC(k).

All of the control circuits CC(k) are formed on a single semiconductor chip CP2 having a terminal GND and a number n pairs of an input terminal Vp(k) and an output terminal Vc(k). The terminal GND is connected to the negative end terminal of the series 10 of battery cells (i.e. the negative terminal of the nth battery cell LC(n)). The input terminal Vp(k) is connected through a resistor Rf(k) to the positive terminal of the battery cell LC(k). The output terminal Vc(k) is connected to the gate of the transistor Tb(k).

The difference between the voltages appearing at two adjacent input terminals Vp(k) and Vp(k+1) represents the cell voltage $V_{cell}$ of the battery cell LC(k), and is used by the control circuit CC(k). The difference between the voltage appearing at the input terminal Vp(n) and the voltage appearing at the terminal GND represents the cell voltage $V_{cell}$ of the nth battery cell LC(n), and is used by the control circuit CC(n).

Figure 2:
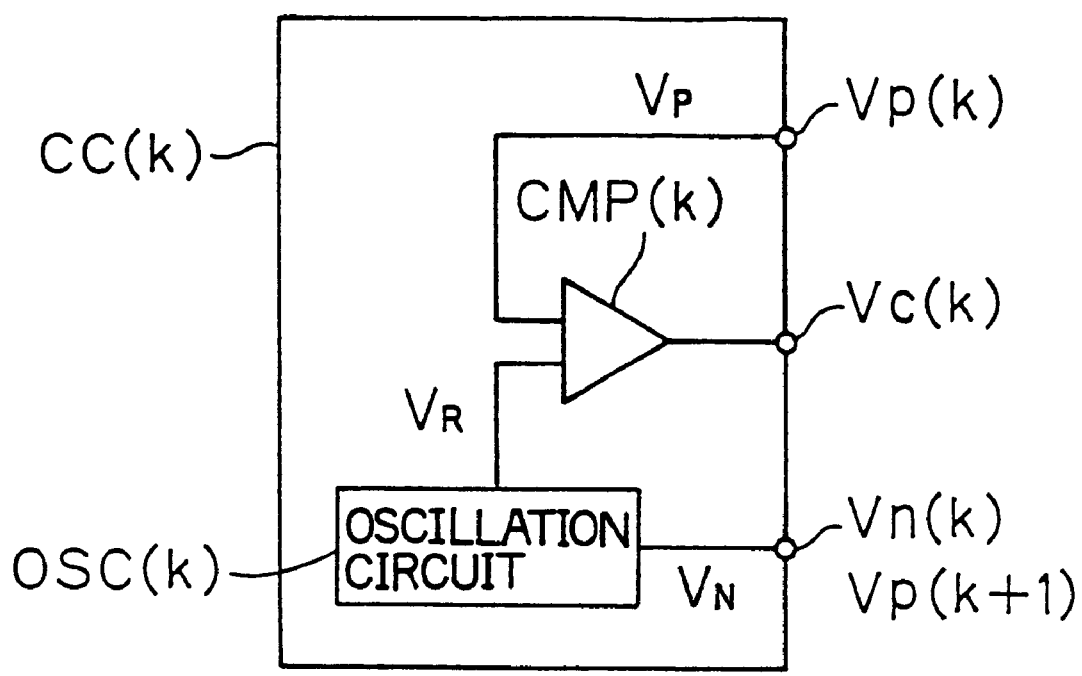
FIG. 2 is a diagram showing the circuit configuration of the control circuit used as a cell balance circuit in the lithium-ion battery pack shown in FIG. 1.

FIG. 2 shows the circuit configuration of the control circuit CC(k). The control circuit CC(k) is composed of an oscillation circuit OSC(k), a comparator CMP(k), the above-mentioned input and output terminals Vp(k) and Vc(k), and an input terminal Vn(k). Here, in reality, the terminal Vn(k) is the same as the terminal Vp(k+1). The output terminal Vc(k) is connected to the output terminal of the comparator CMP(k), and the input terminal Vp(k) is connected to one input terminal of the comparator CMP(k). The input terminal Vn(k) is connected to the input of the oscillation circuit OSC(k), and the output of the oscillation circuit OSC(k) is connected to the other input terminal of the comparator CMP(k).

Figure 3:
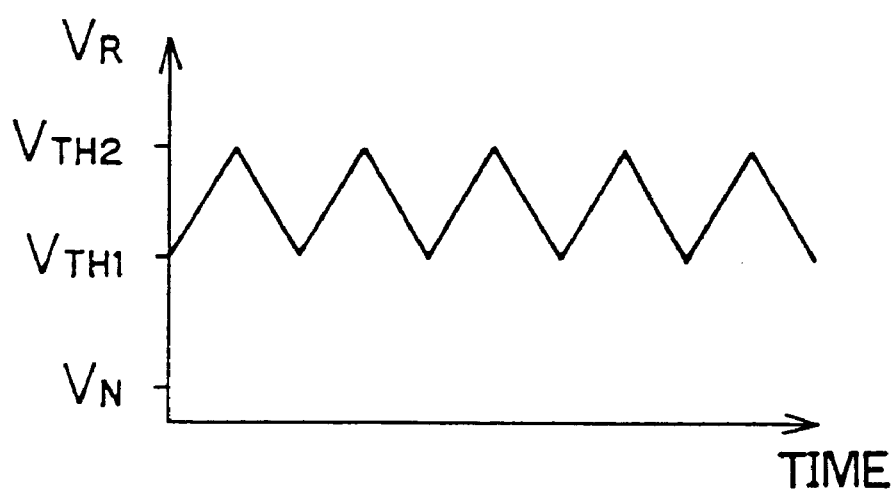
FIG. 3 is a diagram showing an example of the waveform of the output of the oscillation circuit provided in the control circuit shown in FIG. 2.

The oscillation circuit OSC(k) produces a sawtooth wave voltage that oscillates between a first predetermined level $V_{TH1}$, and a second predetermined level $V_{TH2}$ at regular intervals, and outputs the thus produced oscillating voltage as a reference voltage $V_R$ after adding it to the voltage $V_N$ received via the input terminal Vn(k) from the negative terminal of the battery cell LC(k). The first and second predetermined levels $V_{TH1}$ and $V_{TH2}$ are determined in consideration of the maximum and minimum permissible voltages $V_{OCH}$ and $V_{MIN}$ for the battery cell LC(k) so as to be constant relative to the maximum permissible voltage $V_{OCH}$. FIG. 3 shows an example of the waveform of the reference voltage $V_R$ output from the oscillation circuit OSC(k). Note that, although the rising and falling inclinations of the voltage are illustrated as being equal to each other in this figure, they may be different from each other in practice.

The comparator CMP(k) outputs at the output terminal Vc(k) a control voltage that has either of two different levels at a time, and thereby controls the conduction state of the transistor Tb(k). The comparator CMP(k) compares the voltage $V_P$ received via the input terminal Vp(k) from the positive terminal of the battery cell LC(k) with the reference voltage $V_R$ received from the oscillation circuit OSC(k), and changes the level of the control signal it outputs in accordance with the result of the comparison. Specifically, the comparator CMP(k) keeps the transistor Tb(k) in a conducting state when the voltage $V_P$ at the positive terminal of the battery cell LC(k) is equal to or higher than the reference voltage $V_R$, and keeps it in a non-conducting state when the voltage $V_P$ at the positive terminal of the battery cell LC(k) is lower than the reference voltage $V_R$.

Accordingly, when the cell voltage $V_{cell}$ of the battery cell LC(k) is lower than the first predetermined level $V_{TH1}$, the transistor Tb(k) is kept in the non-conducting state, and therefore no current flows through the resistor Rb(k). On the other hand, when the cell voltage $V_{cell}$ of the battery cell LC(k) is equal to or higher than the second predetermined level $V_{TH2}$, the transistor Tb(k) is kept in the conducting state, and therefore a current flows through the resistor Rb(k).

When the cell voltage $V_{cell}$ of the battery cell LC(k) is equal to or higher than the first predetermined level $V_{TH1}$ and lower than the second predetermined level $V_{TH2}$, the result of the comparison by the comparator CMP(k) is inverted at regular intervals in synchronism with the oscillation of the reference voltage $V_R$. As a result, the transistor Tb(k) is brought into the conducting state intermittently, and therefore a current flows through the resistor Rb(k) intermittently. In addition, the length of the individual periods in which the transistor Tb(k) is held in the conducting state varies in proportion to the difference between the cell voltage $V_{cell}$ and the first predetermined level $V_{TH1}$; specifically, the smaller the voltage difference, the shorter the conducting period of the transistor Tb(k), and the larger the voltage difference, the longer the conducting period of the transistor Tb(k).

Thus, when the cell voltage $V_{cell}$ is equal to or higher than the first predetermined level $V_{TH1}$ and lower than the second predetermined level $V_{TH2}$, the control circuit CC(k) subjects the control voltage fed to the transistor Tb(k) to pulse-width modulation (PWM) in accordance with the difference between the cell voltage $V_{cell}$ and the first predetermined level $V_{TH1}$.

Figure 4:
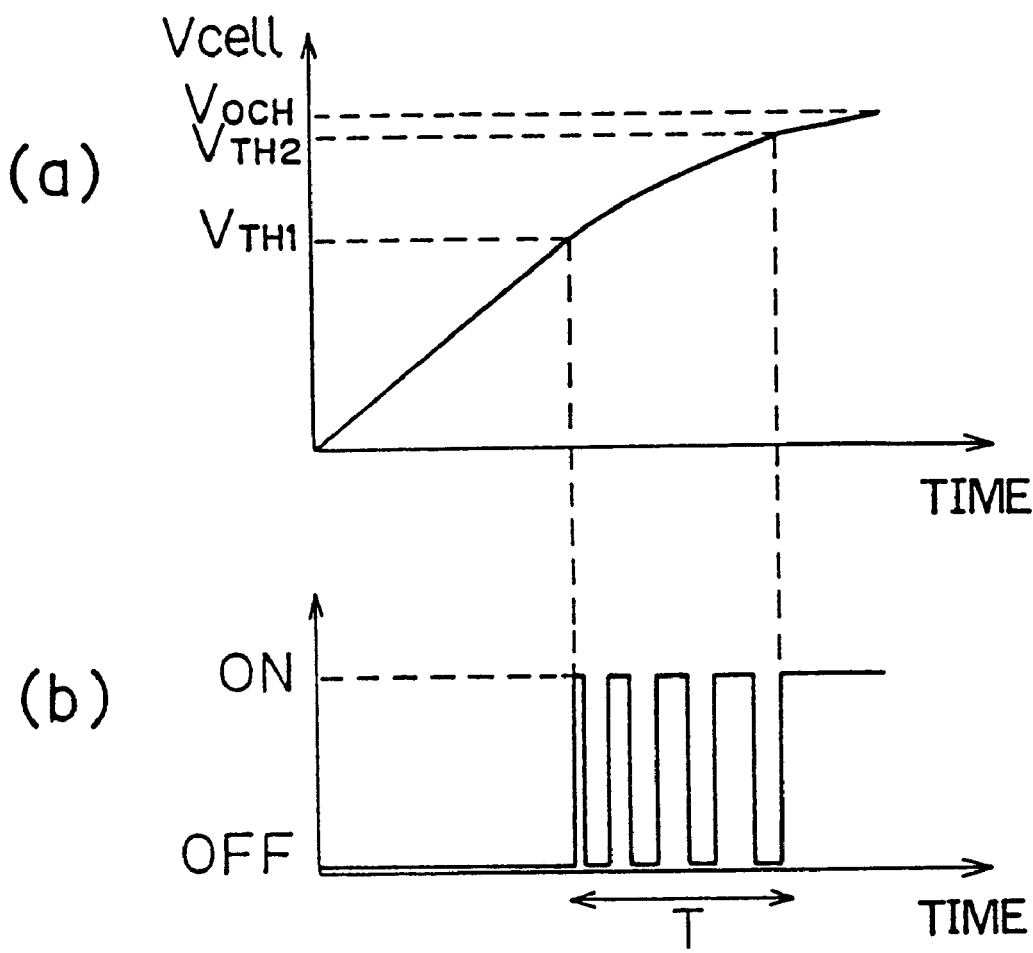
FIGS. 4a–4b are a diagram showing the relationship between the cell voltage of the battery cell and the operation of the transistor provided in the cell balance circuit, as observed during charging in the lithium-ion battery pack shown in FIG. 1.

FIG. 4 shows the relationship between the cell voltage $V_{cell}$ of the battery cell LC(k) and the operation of the transistor Tb(k) as observed while the lithium-ion battery pack 1 is being charged. In FIG. 4, the graph at (a) shows the cell voltage $V_{cell}$ of the battery cell LC(k), and the graph at (b) shows whether the transistor Tb(k) is in a conducting (on) state or in a non-conducting (off) state. In both graphs, the lapse of time after the start of charging is taken along the horizontal axis.

Here, note that, for simplicity's sake, the conduction state of the transistor Tb(k) is illustrated in a simplified manner for the period T during which the cell voltage $V_{cell}$ is in the range between the first and second predetermined levels $V_{TH1}$ and $V_{TH2}$. In reality, during this period T, the conduction state of the transistor Tb(k) changes at short intervals in synchronism with the oscillation cycle of the oscillation circuit OSC(k) in such a way that, as the cell voltage $V_{cell}$ becomes closer to the second predetermined level $V_{TH2}$, the length of the conducting period increases and the length of the non-conducting period decreases within each cycle.

When the cell voltage $V_{cell}$ is lower than the first predetermined level $V_{TH1}$, no current flows through the resistor Rb(k), and a charge current flows through the battery cell LC(k) so that the battery cell LC(k) is charged at a high charging rate. When the cell voltage $V_{cell}$ reaches the first predetermined level $V_{TH1}$, a current starts to flow intermittently through the resistor Rb(k) so that the charging rate of the battery cell LC(k) is gradually reduced. When the cell voltage $V_{cell}$ reaches the second predetermined level $V_{TH2}$, the current starts to flow continuously through the resistor Rb(k) so that only a slight charging current flows through the battery cell LC(k) and thereby the charging rate thereof is reduced further. When the charging finally makes the cell voltage $V_{cell}$ equal to the predetermined maximum permissible voltage $V_{OCH}$, the protection control circuit 14 shuts off the charging current, which is supplied through the transistor 12.

In cases where different amounts of electric charge remain in the individual battery cells LC(k) because of uneven discharging during use, charging proceeds in the following manner. Of the number n of battery cells LC(k), let the battery cell that has the largest amount of electric charge remaining therein be called "cell A", and let the battery cell that has the smallest amount of electric charge remaining therein be called "cell B". After the start of charging, cell A and cell B are at first charged substantially at the same, high charging rate, and the cell voltage of cell A reaches the first predetermined level $V_{TH1}$ earlier. After the cell voltage of cell A reaches the first predetermined level $V_{TH1}$, the charging rate of cell A is gradually reduced, whereas cell B continues to be charged at the initial, high charging rate. Accordingly, when the cell voltage of cell B reaches the first predetermined level $V_{TH1}$, the difference in the charge amount between cells A and B, which was relatively large at the start of charging, has already been reduced greatly.

After the cell voltage of cell B reaches the first predetermined level $V_{TH1}$, the charging rate of cell B is gradually reduced; at this time, the charging rate of cell A, which is already in a later stage of charging, has become even lower. Thus, also during the period T, the difference in the charge amount between cells A and B continues to become smaller. Accordingly, when the cell voltage of cell A reaches the second predetermined level $V_{TH2}$, there remains almost no difference in the charge amount between cells A and B.

The other battery cells, which had less electric charge than cell A and more electric charge than cell B remaining therein at the start of charging, are charged in the same way as cell B so as to eventually have the same charge amount as cell A. Accordingly, when the cell voltage of cell A reaches the second predetermined level $V_{TH2}$, all of the battery cells LC(k) have almost the same charge amount. In this way, the charge amount of all of the battery cells LC(k) is made uniform quickly.

In addition, once the cell voltage of cell A reaches the second predetermined level $V_{TH2}$, it is not necessary to continue the charging for a long time. This helps reduce the time required for charging. Moreover, during the period T, a current flows through the resistor Rb(k) only intermittently, and, after the second predetermined level $V_{TH2}$ has been reached, the length of the period in which a current flows continuously through the resistor Rb(k) is short. This helps reduce the heat produced by the resistor Rb(k). Accordingly, it is possible to increase the charging current without increasing the risk of destroying the resistor Rb(k) with heat, and thereby make the charge amount of all of the battery cells LC(k) uniform even more quickly.

The first and second predetermined levels $V_{TH1}$ and $V_{TH2}$ may be determined arbitrarily; however, it is to be noted that these levels directly affect the time required for charging and the uniformity of the charge amount of the individual battery cells at the end of charging. For satisfactory results, it is preferable to set the first predetermined level $V_{TH1}$ at about 50 to 75% of the maximum permissible voltage $V_{OCH}$, and set the second predetermined level $V_{TH2}$ at about 85 to 95% of the maximum permissible voltage $V_{OCH}$.

The voltage produced by the oscillation circuit OSC(k) may have a waveform other than a sawtooth-shaped waveform; for example, it may have a waveform as obtained by subjecting a sine wave to full-wave rectification. In that case, during the period T in which the cell voltage $V_{cell}$ is in the range between the first and second predetermined levels $V_{TH1}$ and $V_{TH2}$, the length of the period in which the transistor Tb(k) is held in the conducting state does not vary in proportion to the difference between the cell voltage $V_{cell}$ and the first predetermined level $V_{TH1}$; even then, the length of the conducting period of the transistor Tb(k) varies, in a way similar to the way it varies when the produced voltage has a sawtooth-shaped waveform, in accordance with the difference between the cell voltage $V_{cell}$ and the first predetermined level $V_{TH1}$ in such a way that, as the difference becomes larger, the conducting period becomes longer.

Although a relatively high current flows through the resistor Rb(k) and the transistor Tb(k), the protection control circuit 14 and the control circuit CC(k) are formed on a separate chip therefrom, and are therefore almost insusceptible to such a high current. Thus, the lithium-ion battery pack 1 offers high reliability. As the switching device for short-circuiting the two terminals of the battery cell LC(k) through the resistor Rb(k), it is possible to use any appropriate device such as an FET, MOSFET, or bipolar transistor as long as it can be switched between a conducting and a non-conducting state in accordance with the level of the control voltage fed thereto.

Although as many control circuits CC(k) as the battery cells LC(k) are provided in the embodiment described above, it is also possible to form a number of control circuits on the semiconductor chip CP2 so that, in the course of the manufacture of a battery pack, as many control circuits as are necessary are actually connected to the battery cells. This makes it possible to use semiconductor chips of an identical design in various types of battery packs that include different numbers of battery cells, and thus helps enhance manufacturing efficiency.

The series 10 of battery cells may include two or any larger number of battery cells LC(k) so as to offer voltages as desired in specific applications. Moreover, each battery cell LC(k) may be composed of two or more battery cells connected in parallel with each other in order to obtain a lithium-ion battery pack having a large capacity as a whole.

Figure 5:
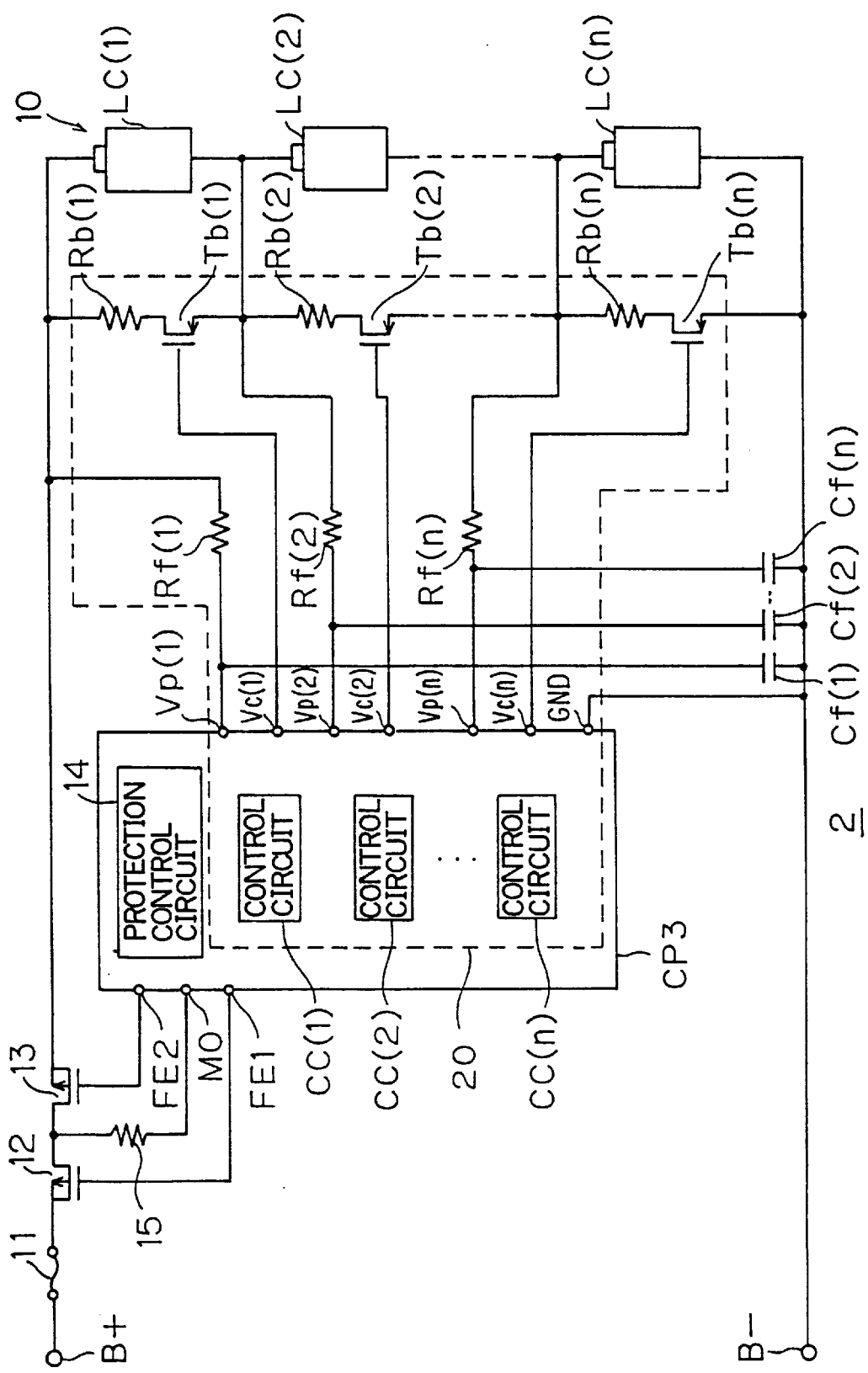
FIG. 5 is a diagram showing the circuit configuration of the lithium-ion battery pack of a second embodiment of the invention.
Figure 6:
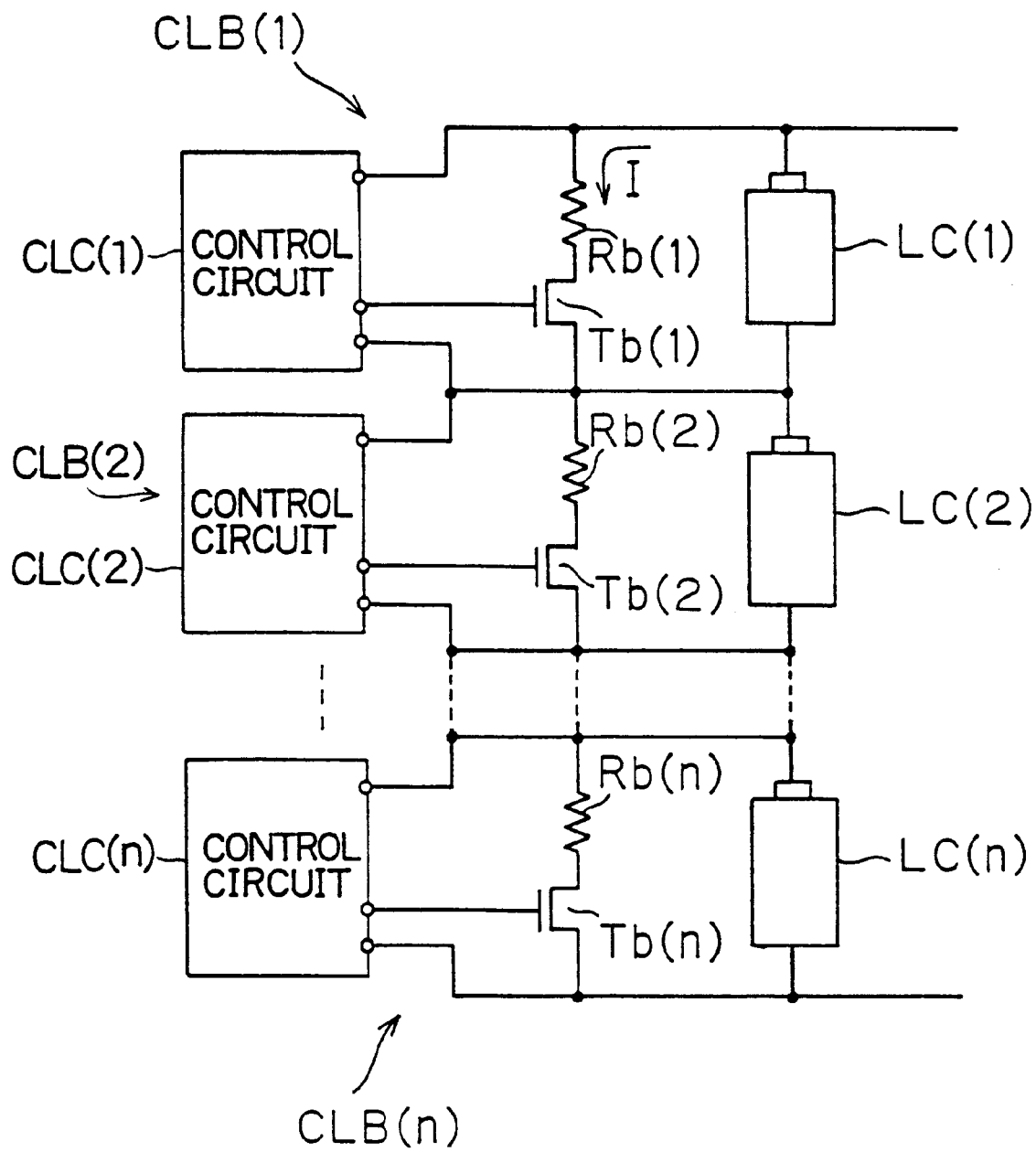
FIG. 6 is a diagram showing the circuit configuration of a conventional lithium-ion battery pack.
Figure 7:
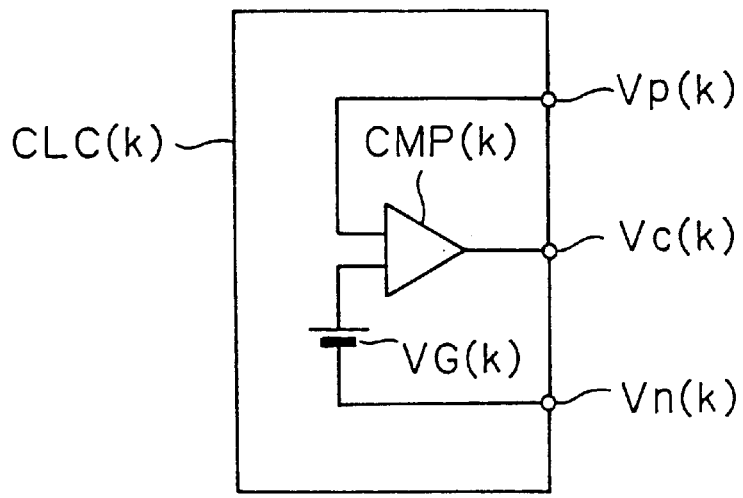
FIG. 7 is a diagram showing the circuit configuration of the control circuit used as a cell balance circuit in the conventional lithium-ion battery pack shown in FIG. 6.
Figure 8:
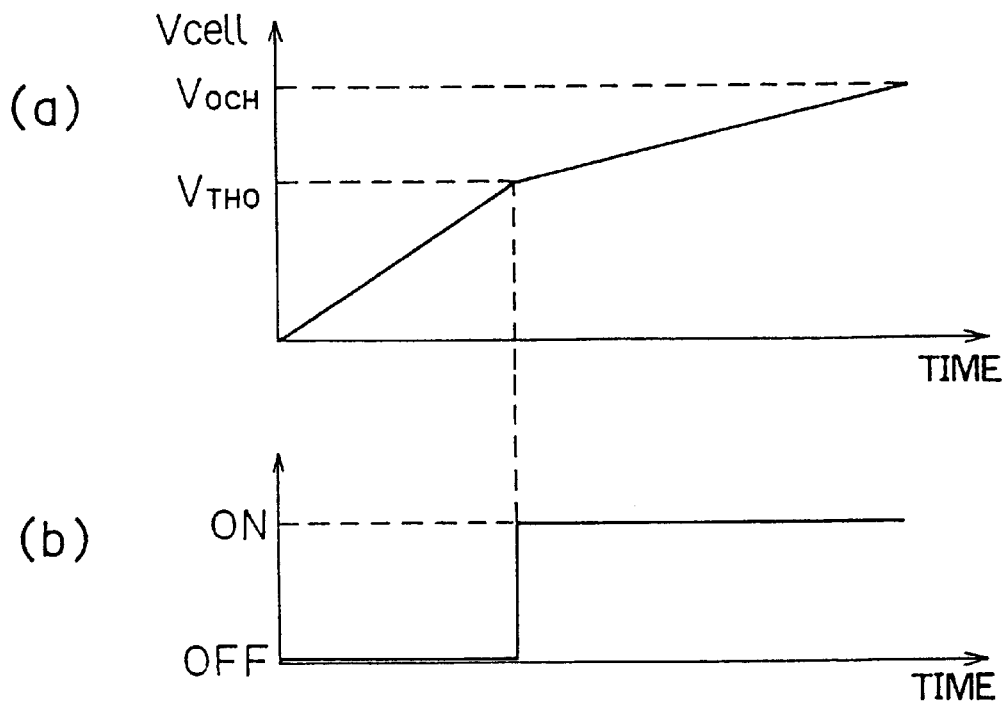
FIGS. 8a–8b are a diagram showing the relationship between the cell voltage of the battery cell and the operation of the transistor provided in the cell balance circuit, as observed during charging in the conventional lithium-ion battery pack shown in FIG. 6.

FIG. 5 shows the circuit configuration of the lithium-ion battery pack 2 of a second embodiment of the invention. In contrast to the lithium-ion battery pack 1 of the first embodiment, where the protection control circuit 14 that controls the transistors 12 and 13 provided for protection against overcharging and overdischarging is formed on one semiconductor chip CP1 and the control circuits CC(k) constituting the cell balance system 20 are formed on another semiconductor chip CP2, in the lithium-ion battery pack 2 of the second embodiment, the protection control circuit 14 and the control circuits CC(k) of the cell balance system 20 are formed on a single semiconductor chip CP3. In terms of the circuit configuration and the operation, there is no difference between the lithium-ion battery packs of the first and second embodiments. The resistors Rb(k) and the transistors Tb(k), which are also constituent elements of the cell balance system 20, are provided separately from the semiconductor chip CP3.

Forming the protection control circuit 14 and the control circuits CC(k) of the cell balance system 20 on a single semiconductor chip CP3 in this way makes the wiring to the battery cells LC(k) easy, and thus helps simplify the manufacturing process of the battery pack In addition, it is possible to minimize the increase in the size of the battery pack that results from the introduction of a cell balance system 20 therein.

As described above, according to the present invention, in a lithium-ion battery pack, it is possible to start the adjustment of the charging rate of the individual battery cells in the early stages of charging, and thus it is possible to make the charge amount of all of the battery cells uniform quickly. Moreover, since the adjustment of the charging rate is achieved by passing a current intermittently through a resistor, it is possible to increase the charging current without increasing the heat produced by the resistor, and thus it is possible to make the charge amount of all of the battery cells uniform more quickly.

In addition, the charging of each battery cell is controlled on the basis of the cell voltage of that battery cell alone and by the use of a constant reference level, and therefore there is no need to provide a means to compare the cell voltages among the battery cells or a means to vary the reference level. This helps simplify the circuit configuration required to control charging, and thereby minimize the increase in the size and weight of the battery pack.

Obviously, many modifications and variations of the present invention are possible in light of the above teachings. It is therefore to be understood that within the scope of the appended claims, the invention may be practiced other than as specifically described.

What is claimed is:

1. A lithium-ion battery pack comprising:

a series of battery cells composed of a plurality of battery cells connected in series;

a set of a resistor and a switching device connected in series and provided one set for each of said battery cells, said set of the resistor and the switching device having one end connected to a positive terminal of the battery cell and having the other end connected to a negative terminal of the battery cell so that, every time the switching device conducts, the positive and negative terminals of the battery cell are short-circuited with each other through the resistor; and a control circuit provided one for each of said battery cells, wherein, while said series of battery cells is being charged, with a voltage applied between two end terminals thereof, said control circuit monitors a voltage between the positive and negative terminals of the battery cell to control the switching device in such a way that, when the monitored voltage is lower than a first predetermined level that is fixed relative to a maximum permissible voltage for the battery cell, the switching device is continuously kept in a non-conducting state, that, when the monitored voltage is equal to or higher than the first predetermined level and lower than a second predetermined level that is fixed relative to the maximum permissible voltage for the battery cell, the switching device is intermittently brought into a conducting state, and that, when the monitored voltage is equal to or higher than the second predetermined voltage, the switching device is kept continuously in the conducting state.

2. A lithium-ion battery pack as claimed in claim 1, wherein, when the monitored voltage is equal to or higher than the first predetermined voltage and lower than the second predetermined voltage, said control circuit varies a length of a period in which the switching device is held in the conducting state in accordance with a difference between the monitored voltage and the first predetermined level.

3. A lithium-ion battery pack as claimed in claim 2, wherein, when the monitored voltage is equal to or higher than the first predetermined voltage and lower than the second predetermined voltage, said control circuit varies the length of the period in which the switching device is held in the conducting state substantially in proportion to the difference between the monitored voltage and the first predetermined level.

4. A lithium-ion battery pack as claimed in claim 3, wherein, when the monitored voltage is equal to or higher than the first predetermined voltage and lower than the second predetermined voltage, said control circuit brings the switching device into the conducting state at regular intervals in such a way as to keep constant a sum of the length of the period in which the switching device is held in the conducting state and a length of a period in which the switching device is held in the non-conducting state.

5. A lithium-ion battery pack as claimed in claim 4, wherein said control circuit comprises:

an oscillation circuit for producing a sawtooth wave voltage that oscillates between the first predetermined voltage and the second predetermined voltage at said regular intervals, said oscillation circuit outputting the sawtooth wave voltage after adding it to a voltage at the negative terminal of the battery cell; and a comparator for comparing a voltage at the positive terminal of the battery cell with the sawtooth wave voltage output from said oscillation circuit, said comparator outputting, when the voltage at the positive terminal of the battery cell is equal to or higher than the sawtooth wave voltage output from said oscillation circuit, a first control voltage that causes the switching device to be brought into the conducting state and, when the voltage at the positive terminal of the battery cell is lower than the sawtooth wave voltage output from said oscillation circuit, a second control voltage that causes the switching device to be brought into the non-conducting state.

6. A lithium-ion battery pack as claimed in claim 1, wherein all of said control circuit provided one for each of said battery cells are formed within a single semiconductor chip, and all of said set of the resistor and the switching device provided one set for each of said battery cells are formed separately from said semiconductor chip.

7. A lithium-ion battery pack as claimed in claim 6, further comprising:

a first electrode terminal connected through a protection switching device to one of the two end terminals of said series of battery cells;

a second electrode terminal connected to the other of the two end terminals of said series of battery cells; and a protection control circuit for monitoring the voltage between the positive and negative terminals of each of said battery cells so that, when at least one of the monitored voltages is out of a predetermined range, said protection switching device is brought into a cut-off state to inhibit charging or discharging of said series of battery cells, wherein said protection control circuit is formed within said semiconductor chip.

* * * * *